(12) United States Patent
Van Wageningen et al.

(10) Patent No.: US 7,248,583 B2
(45) Date of Patent: Jul. 24, 2007

(54) PARALLEL AND ITERATIVE ALGORITHM FOR SWITCHING DATA PACKETS

(75) Inventors: Andries Van Wageningen, Wijlre (NL); Hans Juergen Reumerman, Aachen (DE); Armand Lelkens, Heerlen (NL); Rainer Schoenen, Aachen (DE)

(73) Assignee: NXP B.V., Eindhoven (NL)

( * ) Notice: Subject to any disclaimer, the term of this patent is extended or adjusted under 35 U.S.C. 154(b) by 1128 days.

(21) Appl. No.: 10/213,407

(22) Filed: Aug. 6, 2002

(65) Prior Publication Data

US 2003/0031171 A1 Feb. 13, 2003

(30) Foreign Application Priority Data

Aug. 9, 2001 (DE) ............... 101 39 233

(51) Int. Cl.
*H04L 12/28* (2006.01)
(52) U.S. Cl. ....................... 370/392; 370/360
(58) Field of Classification Search ............... 370/389, 370/392, 357, 360, 375
See application file for complete search history.

(56) References Cited

U.S. PATENT DOCUMENTS 5,267,235 A 11/1993 Thacker ................ 370/60

| 5,500,858 A | 3/1996 | McKeown ................ 370/60 |
| 5,923,656 A * | 7/1999 | Duan et al. ............ 370/395.4 |
| 6,570,873 B1 * | 5/2003 | Isoyama et al. ........... 370/375 |
| 2003/0031193 A1 * | 2/2003 | Andrews et al. .......... 370/412 |

OTHER PUBLICATIONS

002250376, Jun. 1999, Germany.
10196315A, Oct. 16, 1995, USA.

* cited by examiner

*Primary Examiner*—Derrick W. Ferris

(57) ABSTRACT

The invention relates to a packet switching device with a plurality of input and output ports and at least one switching unit (3 to 5) comprising a coupling matrix and an arbiter unit (9) for controlling the coupling matrix (8), wherein the arbiter unit is designed for generating a state matrix (11) whose lines each correspond to an input port and whose columns each correspond to an output port, said state matrix comprises elements which each represent a weighting for an interconnection between an input port and an output port of the packet switching device, and said arbiter unit (9) is designed for forming a first decision matrix consisting of several accepted interrelationships on the basis of an algorithm which is operative in parallel on several groups (12 and 14) of columns of the state matrix.

8 Claims, 3 Drawing Sheets

PARALLEL AND ITERATIVE ALGORITHM FOR SWITCHING DATA PACKETS

The invention relates to a packet switching device with a plurality of line units and switching units.

The publication "Weighted Arbitration Algorithms with Priorities for Input-Queued Switches with 100% Throughput" by R. Schoenen, G. Post, G. Sander, Broadband Switching Symposium '99, compares various weighted switching algorithms of a packet switching device. The switching algorithms attempt to prevent a collision of several packets designated for the same output port of the packet switching device by means of different switching steps and to reduce any resulting data losses or delays.

The publication relates to an arbitration algorithm based on relative weights for interconnecting input and output ports. A matrix then consists of elements which each represent a weight allocation for the switching of a given input port of the data packet to a given output port of a switching device. The lines and columns of the matrix correspond to the input and output ports of the switching device for data packets. A weighting as high as possible is selected in each column of the matrix and is marked as an accepted interconnection between an input and an output port. In the subsequent calculation, the selected input port, i.e. the line of the matrix corresponding to the input port, is not used any further.

The invention has for its object to render possible a quickly calculated switching of data packets within a packet switching device.

This object is achieved by means of a packet switching device with a plurality of input and output ports and at least one switching unit comprising a coupling matrix and an arbiter unit for controlling the coupling matrix, wherein the arbiter unit is designed for generating a state matrix whose lines each correspond to an input port and whose columns each correspond to an output port, said state matrix comprises elements which each represent a weighting for an interconnection between an input port and an output port of the packet switching device, and said arbiter unit is designed for forming a first decision matrix consisting of several accepted interrelationships on the basis of an algorithm which is operative in parallel on several groups of columns of the state matrix.

A packet switching device consists of several line units or line cards and several switching units or switch cards. An essential component of a line unit is a port control. Each port control is connected to several switching units operating in parallel and has the task of arranging packets to be switched, arriving at the packet switching device, in waiting lines or queues in accordance with their priorities and desired output ports in the packet switching device.

Each switching unit of the packet switching device consists of a coupling or crosspoint matrix and an arbiter unit or arbiter. The configuration of the coupling matrix is newly determined by the arbiter unit by means of an algorithm at regular time intervals, so that new interconnections are established between the input and output ports of the packet switching device for the switching of the packets.

A state matrix of the packet switching device comprises several elements which represent a weighting of each interconnection between an input port and an output port. The weightings are generated by the port control, so that the port control is capable of informing the arbiter unit whether and how urgently the packets present in the input port are to be transported. A weighting may contain indicators on the priority and class of the packets, or the waiting time or length of a waiting line or queue.

A line of the state matrix corresponds to an input port, and each column corresponds to an output port of the packet switching device. The arbiter unit carries out an algorithm simultaneously on a group of columns each time. The group of columns may consist of a plurality of columns, which need not necessarily be arranged next to one another in the state matrix. Two or more adjoining columns, however, may also form a group. After the algorithm has been implemented, the arbiter unit marks each accepted interconnection in a first, provisional decision matrix.

The algorithm may be a Successive Incremental Matching over Multiple Ports (SIMP) algorithm which is described in "Weighted Arbitration Algorithms with Priorities for Input-Queued Switches with 100% Throughput" by R. Schoenen, G. Post, G. Sander, Broadband Switching Symposium '99. The simultaneous implementation of the algorithm applied to the state matrix may give rise to an interconnection in which one input port is simultaneously associated with two output ports for a data packet.

Two conditions must be fulfilled in the calculation of the interconnections. One input port cannot be simultaneously associated with several output ports and/or one output port cannot be associated with several input ports. The results of the algorithms running in parallel are retained in the first decision matrix. The parallel processing of the groups of columns, however, may lead to several output ports being allocated to one input port. For this reason, the interconnection with the highest weight is selected in each line of the first decision matrix and recorded in a second decision matrix.

The arbiter unit determines a final decision matrix for the configuration of the coupling matrix by means of an iterative process. One iteration step consists of an implementation of the algorithm operating in parallel and the formation of the decision matrix consisting of the selected interconnections. The arbiter unit here forms the groups from those columns for which no interconnection was determined yet or applies the algorithm to those lines and columns for whose input ports no accepted interconnection to an output port was achieved. In the most favorable case, an iteration step leads to an interconnection of all input and output ports.

It can be safeguarded by an iterative determination of the final decision matrix that favorable interconnections between the input ports and the output ports are achieved, leading to a fast and reliable switching of data packets.

The interconnection with the highest weight is selected in each column of a group of the state matrix and is marked as an accepted interconnection between an input and an output port. The selected input port, i.e. the line corresponding to the input port, in each group of columns is not taken into account in the further implementation of the algorithm and is marked accordingly.

The port control generates the weights for determining a configuration of the coupling matrix and sends them to the arbiter unit at regular time intervals. A preferred embodiment of the state matrix comprises elements which each represent a difference between a current weight of an interconnection generated by the port control and a weight generated one time interval earlier.

The invention also relates to a switching unit for a packet switching device with a plurality of input and output ports. The switching unit consists of a coupling matrix and an arbiter unit for controlling the coupling matrix, while a state matrix with elements is provided in the arbiter unit, which elements each represent a weight of an interconnection between an input port and an output port of the packet switching device, while the lines thereof each correspond to an input port and the columns each correspond to an output port. The arbiter unit forms a first decision matrix by means of an algorithm operating in parallel on several groups of columns of the state matrix. The first decision matrix consists of several accepted interconnections between the input and output ports of the packet switching device.

The invention further relates to an arbiter unit for controlling the coupling matrix of a switching unit for a packet switching device with several input and output ports. A state matrix with elements is provided here in the arbiter unit, which elements each represent an interconnection between an input port and an output port of the packet switching device, while the lines thereof each correspond to an input port and the columns each correspond to an output port. The arbiter unit forms a first decision matrix by means of an algorithm operating in parallel on several groups of columns of the state matrix. The first decision matrix consists of several accepted interconnections between the input and output ports of the packet switching device.

The invention further relates to a switching method for a packet switching device with several input and output ports and at least one switching unit or switch card. The switching unit comprises a coupling matrix and an arbiter unit for controlling the coupling matrix. A state matrix is provided in the arbiter unit here, with elements which each represent a weighting of an interconnection between an input port and an output port of the packet switching device, while the lines thereof each correspond to an input port and the columns each correspond to an output port. The arbiter unit forms a first decision matrix by means of an algorithm operating in parallel on several groups of columns of the state matrix, which decision matrix consists of several accepted interconnections.

An embodiment of the invention will be explained in more detail below with reference to the Figures, in which.

Figure 1:
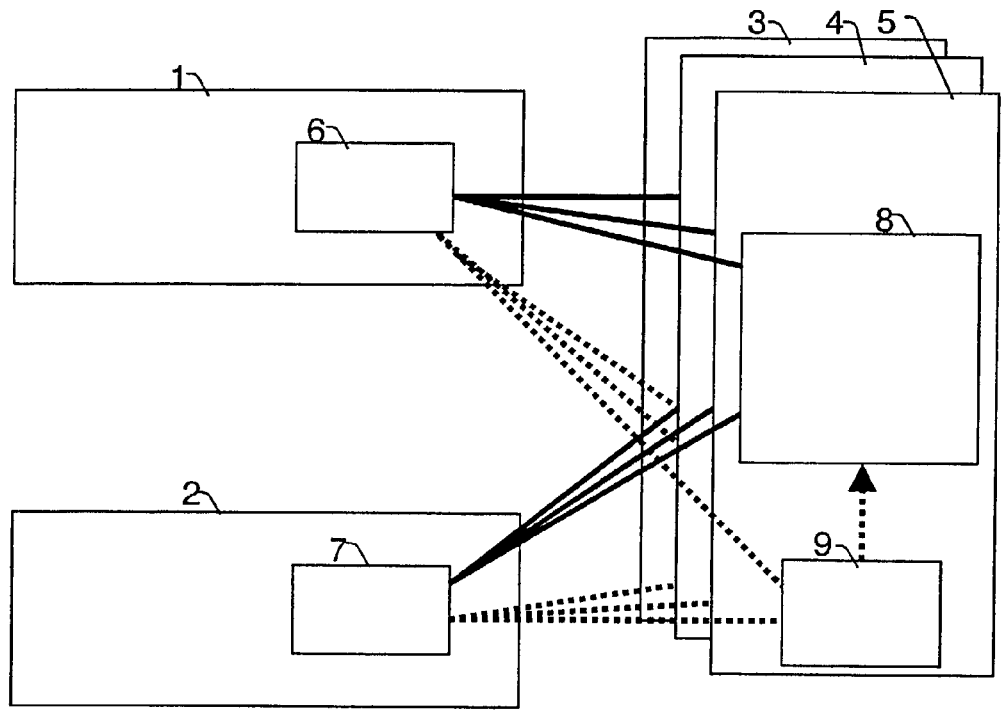
FIG. 1 shows a packet switching device.

A packet switching device shown in FIG. 1 consists of two line units 1 and 2 and a plurality of switching units 3 to 5. The number of line units 1 and 2 will often be much greater than two, for example 64; it was limited to two in the embodiment for keeping the Figure clear. The line units 1 and 2 each consist of individual components which are irrelevant for the description of the embodiment and which are accordingly not shown, such as an optical transmission unit, a frame generator, a network processor, etc., as well as a port control 6, 7 which is essential for the embodiment of the invention. Each switching unit 3 to 5 consists of a coupling matrix 8 and an arbiter unit 9. Both the arbiter unit 9 and the coupling matrix 8 of each parallel-operating switching unit 3 to 5 are connected to the port control 6 and 7.

Data packets of constant length are denoted cells. Since the cells of constant length are easier to handle in the switching process than packets of varying size, the incoming packets are subdivided into cells of constant length within the line units 1 and 2 and are put into intermediate storage in the form of queues. After a successful switching, i.e. an accepted allocation of one input port to one output port each time, the cells are removed from the queue.

On the basis of a weighting, the port control can inform the arbiter unit whether and how urgently the cells present in the input port are to be passed on. The weighting may include indicators on the priority and class of the packets or the waiting time or length of a queue in the input port.

The port control 6 and 7 sends the information necessary for determining the configuration of the coupling matrix, among which the weighting, to the arbiter unit 9.

After the arbiter unit has determined the configuration of the coupling matrix 8 and has sent this configuration both to the port control and to the coupling matrix, the coupling matrix 8 of each switching unit is configured accordingly. The port control 6 and 7 sends the cells to the coupling matrix 8 for switching at regular time intervals, the so-called cell periods.

Figure 2:
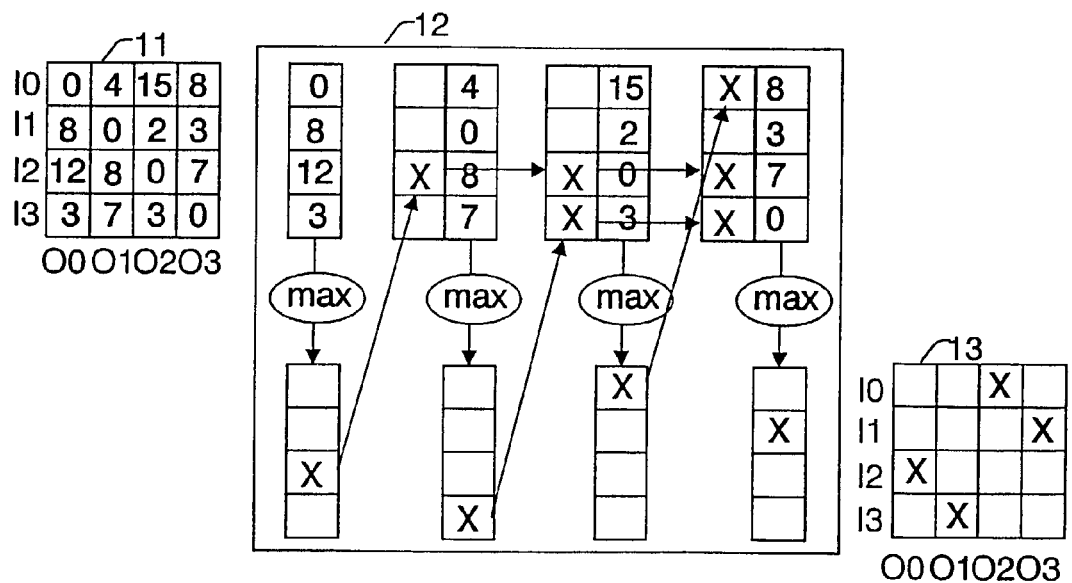
FIG. 2 shows an algorithm applied to a group of columns.

FIG. 2 shows an algorithm carried out by the arbiter unit 9 and applied to a group of columns for the configuration of the coupling matrix 8. The algorithm is the one proposed in the publication "Weighted Arbitration Algorithms with Priorities for Input-Queued Switches with 100% Throughput" by R. Schoenen, G. Post, G. Sander, Broadband Switching Symposium '99. FIG. 2 consists of a status matrix 11, a group 12 of columns, and a decision matrix 13.

The state matrix 11 corresponds to a packet switching device with four input ports I0 to I3 and four output ports O0 to O3. It comprises sixteen elements which represent the respective weights of all interconnections between the input ports I0 to I3 and the output ports O0 to O3.

In the embodiment of FIG. 2, the number of columns and lines, i.e. of the input and output ports, was limited to four so as to obtain a simple representation. The number of groups was reduced to one group, comprising all columns of the state matrix 11.

The algorithm applied is composed of four steps:

the highest weight of the column is determined in the first column of the state matrix 11;

in the next column, the highest weight of the column is again determined, with the proviso that the weight of the previously selected line or input port is not counted;

in the determination of the highest weight in the next column, the weightings of the previously selected lines or input ports are not taken into account;

the determination of the highest weight in each column is thus continued up to and including the final column of the state matrix.

The arbiter unit applies the algorithm to the group 12 of columns and determines the weight of the input port I2 as being the highest weight in the first column or output port O0. The selected weighting is marked as an accepted interconnection between the input port I2 and the output port O0. In determining the highest weight in the next column, the weight of the input port I2 is not taken into account, and the interconnection between the input port I3 and the output port O1 is marked.

For the output port O2, the weights of the input ports I0 and I1 are taken into account when selecting the greatest weight, and the input port I0 is determined as the accepted interconnection. The result is that only the input port I3 can be selected as the accepted connection for the output port O3.

The accepted interconnections are marked in the decision matrix 13.

Figure 3:
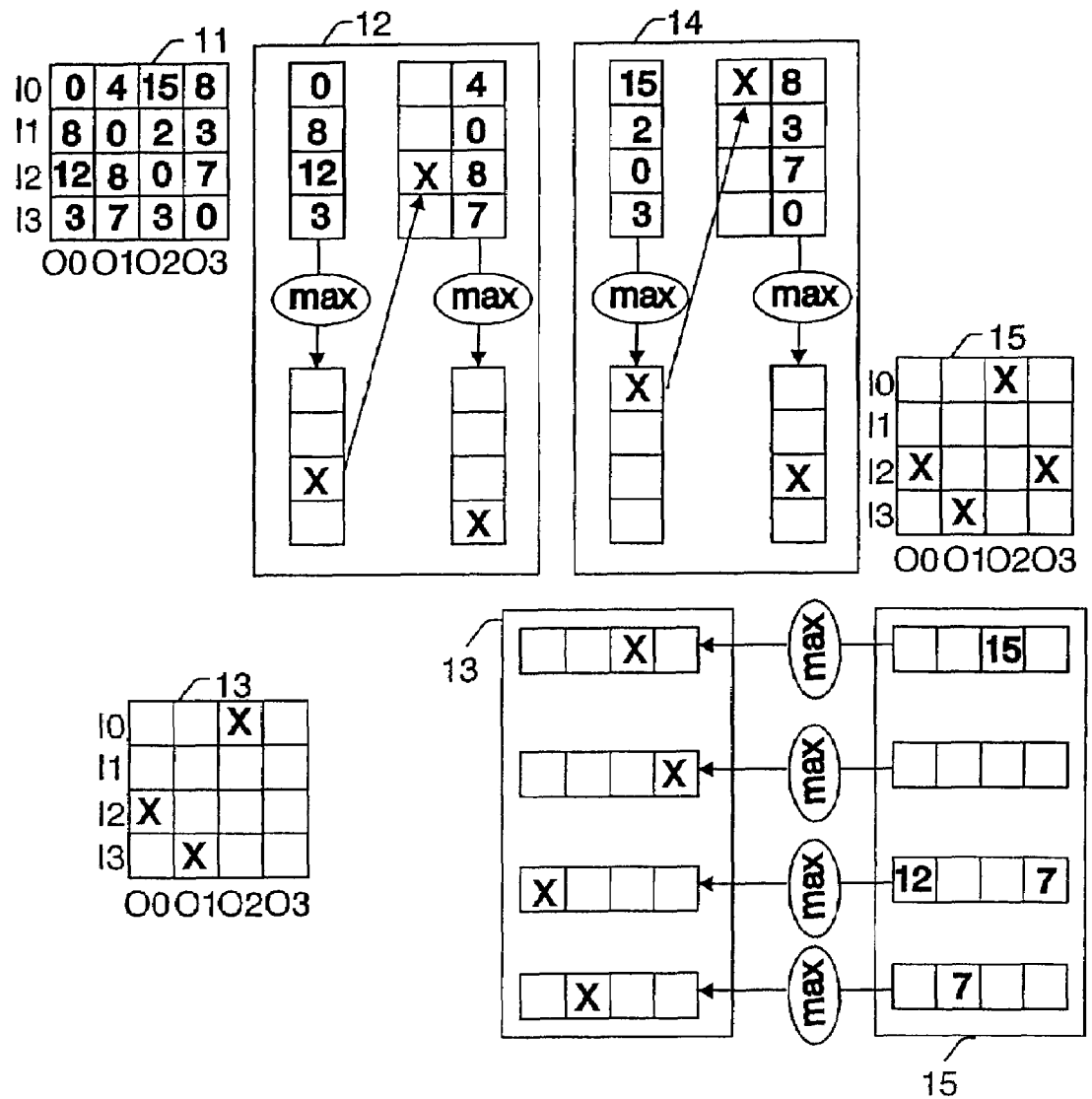
FIG. 3 shows an algorithm applied in parallel to several groups of columns for switching purposes.

FIG. 3 serves to clarify an algorithm applied in parallel and iteratively for switching as described with reference to FIG. 2. The state matrix 11, the decision matrix 13, and the group 12 of columns are supplemented with a second group 14 and a provisional decision matrix 15.

The columns of the state matrix 11 have been subdivided into groups 12 and 14 of two columns each. The algorithm of FIG. 2 is carried out by the arbiter unit 9 in parallel for each group 12 and 14.

The results of the two columns are retained in the provisional decision matrix 15. The columns of the first group 12 are connected to the input ports I2 and I3, and the columns of the second group 14 to the input ports I0 and I2, respectively. Owing to the parallel processing of the two groups, the input port I2 was allocated both to the output port O0 and the output port O3.

Therefore, the highest weight is determined for the accepted interconnection in each line of the provisional decision matrix 15. The marked interconnection of the first line of the provisional decision matrix 15 is taken over as the accepted interconnection in the decision matrix 13. No interconnection was entered for the input port I1 in the provisional decision matrix 15, which is why an interconnection between an output port and the input port I1 is also absent in the decision matrix 13. Since two interconnections were selected for the input port I2, it is decided on the basis of the weightings which of the interconnections is accepted.

The interconnection with the higher weight is accepted in the decision matrix 13, so that the input port I2 is marked with the output port O0 as the accepted interconnection. For the input port I3, the marked interconnection from the provisional decision matrix 15 is adopted as the accepted interconnection.

The interconnections of the decision matrix 13 are improved through iteration in that the arbiter unit 9 applies the parallel-operating algorithm to those lines of the state matrix 11 for whose input ports no connection to an output port was achieved. Only those output ports that have not yet been interconnected are taken into account here.

Since no connection to an output port was determined for the input port I1, the algorithm is iteratively applied to the state matrix 11. The input ports I0, I2, and I3 already interconnected as well as the output ports O0 to O2 are no longer taken into account.

Figure 4:
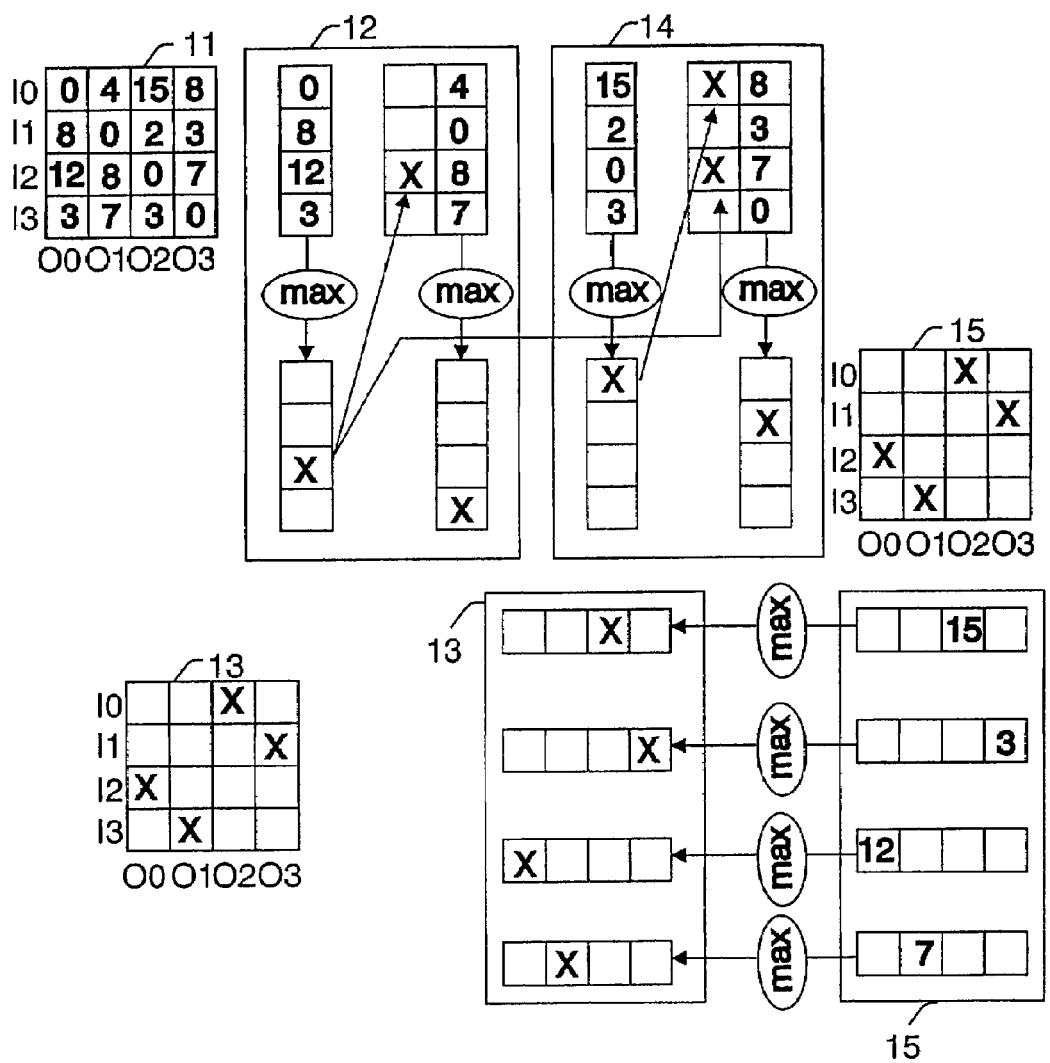
FIG. 4 shows an interconnection of the groups of columns.

In FIG. 4, the parallel processing of the groups 12 and 14 is improved with an interconnection of the groups 12 and 14.

The columns of the state matrix 11 have been subdivided into groups 12 and 14 of two columns each. The algorithm described with reference to FIG. 2 is applied by the arbiter unit 9 in each group 12 and 14 in parallel. The algorithm is complemented with an interconnection of the groups 12 and 14.

The algorithm applied to each group is carried out in parallel by the arbiter unit for all groups and is composed of four steps:
 the highest weight of the column is determined in the first column of each group;
 in the next column, again, the highest weight of the column is determined, with the proviso that the weight of the previously selected line or input port is not taken into account in all groups;
 the weights of the previously selected lines or input ports are not taken into account in the determination of the greatest weight in the next column;
 the determination of the greatest weight in each column is thus continued up to and including the final column of the state matrix.

The results of the two columns are retained in the provisional decision matrix 15. The columns of the first group 12 are connected to the input ports I2 and I3, and the columns of the second group 14 to the input ports I0 and I1, respectively. Owing to the interconnection of the groups, the input port I2 is not allocated simultaneously to the output port O0 and the output port O3.

Furthermore, the highest weighting is determined as being the accepted interconnection in each line of the provisional decision matrix 15. The marked interconnection of the first line of the provisional decision matrix 15 is adopted as the accepted interconnection in the decision matrix 13. The output port O3 was marked in the provisional decision matrix 15 for the input port I1, so that accordingly the decision matrix 13 also contains an interrelationship between the output port O3 and the input port I1. An interconnection with the output port O0 was marked for the input port I2. The interconnection with the highest weight is accepted in the decision matrix 13 if several interconnections were marked in the decision matrix 15 for one input port.

If not all input ports I0 to I3 were interconnected in the decision matrix 13, the decision matrix 13 can be improved through an iteration step in that the arbiter unit 9 applies the parallel-operating algorithm to those lines of the state matrix 11 for whose input ports no interconnection to an output port was achieved. Only those output ports not yet interconnected are taken into account here.

The invention claimed is:

1. A packet switching device with a plurality of input and output ports and at least one switching unit (3 to 5) comprising a coupling matrix and an arbiter unit (9) for controlling the coupling matrix (8), wherein the arbiter unit is designed for generating a state matrix (11) whose lines each correspond to an input port and whose columns each correspond to an output port, said state matrix comprises elements which each represent a weighting for an interconnection between an input port and an output port of the packet switching device, and said arbiter unit (9) is designed for forming a first decision matrix consisting of several accepted interrelationships on the basis of an algorithm which processes a first group of columns of the state matrix at the same time as a second group of columns of the state matrix.

2. A packet switching device as claimed in claim 1, characterized in that the arbiter unit is designed for selecting the interconnection with the highest weight if several interconnections were accepted for one input port in the first decision matrix, and forming a decision matrix consisting of the selected interconnections.

3. A packet switching device as claimed in claim 2, characterized in that the arbiter unit is designed for connecting the input ports to the output ports in an iterative process.

4. A packet switching device as claimed in claim 2, characterized in that the arbiter unit is designed for carrying out the algorithm on a group (12 and 14), wherein in each column of the group (12 and 14) the interconnection with the highest weight is accepted, and the interconnected input port is not taken into account in the next column of all groups (12 and 14).

5. A packet switching device as claimed in claim 1, characterized in that the state matrix (11) comprises elements which each represent a difference between a current weighting of an interconnection between an input port and an output port of the packet switching device and a weighting previously generated by the port control.

6. A switching unit for a packet switching device comprising several input and output ports, which switching unit (3 to 5) comprises a coupling matrix and an arbiter unit (9) for controlling the coupling matrix (8), wherein the arbiter unit is designed for generating a state matrix (11) whose lines each correspond to an input port and whose columns each correspond to an output port, said state matrix comprises elements which each represent a weighting for an interconnection between an input port and an output port of the packet switching device, and said arbiter unit (9) is designed for forming a first decision matrix consisting of several accepted interrelationships on the basis of an algorithm which processes a first group of columns of the state matrix at the same time as a second group of columns of the state matrix.

7. An arbiter unit (9) for controlling the coupling matrix (8) in a switching unit (3 to 5) of a packet switching device comprising several input and output ports, wherein the arbiter unit is designed for generating a state matrix (11) whose lines each correspond to an input port and whose columns each correspond to an output port, said state matrix comprises elements which each represent a weighting for an interconnection between an input port and an output port of the packet switching device, and said arbiter unit (9) is designed for forming a first decision matrix consisting of several accepted interrelationships on the basis of an algorithm which processes a first group of columns of the state matrix at the same time as a second group of columns of the state matrix.

8. A switching method for a packet switching device comprising several input and output ports and at least one switching unit (3 to 5) comprising a coupling matrix and an arbiter unit (9) for controlling the coupling matrix (8), wherein a state matrix (11) is generated in the arbiter unit, the lines of said matrix each corresponding to an input port and the columns of said matrix each corresponding to an output port, the state matrix comprises elements which each represent a weighting of an interconnection between an input port and an output port of the packet switching device, and a first decision matrix, consisting of several accepted inter connections, is formed on the basis of an algorithm which processes a first group of columns of the state matrix at the same time as a second group of columns of the state matrix.

* * * * *